(12) United States Patent
Lee et al.

(10) Patent No.: US 7,903,147 B2
(45) Date of Patent: Mar. 8, 2011

(54) SYSTEM AND METHOD OF DETECTING COMMUNICATION DEVICE HAVING BUILT-IN CAMERA

(75) Inventors: Yong-hee Lee, Seongnam-si (KR); Hyung-geun Lee, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1551 days.

(21) Appl. No.: 10/879,714

(22) Filed: Jun. 28, 2004

(65) Prior Publication Data

US 2005/0030384 A1 Feb. 10, 2005

(30) Foreign Application Priority Data

| Jun. 27, 2003 | (KR) | 10-2003-0042797 |
| Oct. 6, 2003 | (KR) | 10-2003-0069145 |
| Nov. 20, 2003 | (KR) | 10-2003-0082646 |
| Apr. 23, 2004 | (KR) | 10-2004-0028167 |

(51) Int. Cl.
*H04N 5/228* (2006.01)

(52) U.S. Cl. ............. 348/222.1; 455/411; 455/431; 455/434; 455/456.1

(58) Field of Classification Search ............. 348/211.2, 348/231.3, 552, 372, 211.99, 222.1; 455/411, 455/410, 431, 434, 456.1
See application file for complete search history.

(56) References Cited

U.S. PATENT DOCUMENTS

| 5,991,614 A | * | 11/1999 | Oura | 455/404.1 |
| 6,222,458 B1 | * | 4/2001 | Harris | 340/686.6 |
| 7,194,278 B1 | * | 3/2007 | Cook | 455/461 |
| 2002/0149680 A1 | * | 10/2002 | Hunter et al. | 348/208.14 |
| 2003/0133573 A1 | * | 7/2003 | Himmel et al. | 380/258 |
| 2003/0151669 A1 | * | 8/2003 | Robins et al. | 348/207.99 |
| 2004/0228460 A1 | * | 11/2004 | Keramane | 379/110.01 |
| 2007/0129012 A1 | * | 6/2007 | Snow | 455/26.1 |

FOREIGN PATENT DOCUMENTS

| EP | 1182901 A2 | * | 2/2002 |
| GB | 2375870 | | 11/2002 |
| JP | 2000-152217 | | 5/2000 |
| JP | 2000152217 A | * | 5/2000 |
| JP | 2002-027554 | | 1/2002 |
| JP | 2003-078810 | | 3/2003 |
| KR | 2000-031051 | | 6/2000 |

OTHER PUBLICATIONS

English Abstract for Publication No. 2002-027554.
English Abstract for Publication No. 2003-078810.

* cited by examiner

*Primary Examiner*—Yogesh K Aggarwal
(74) *Attorney, Agent, or Firm*—F. Chau & Associates, LLC

(57) ABSTRACT

Provided are a communication device having a built-in camera and a system and method of detecting a communication device having a built-in camera. In the system, a communication device can transmit camera existence data or particular identification data thereof, and in response thereto, a detection device can suspend a camera function of the communication device when a user with the communication device enters a security zone. In addition, the detection device can recover the camera function when the user with the communication device exits the security zone.

19 Claims, 12 Drawing Sheets

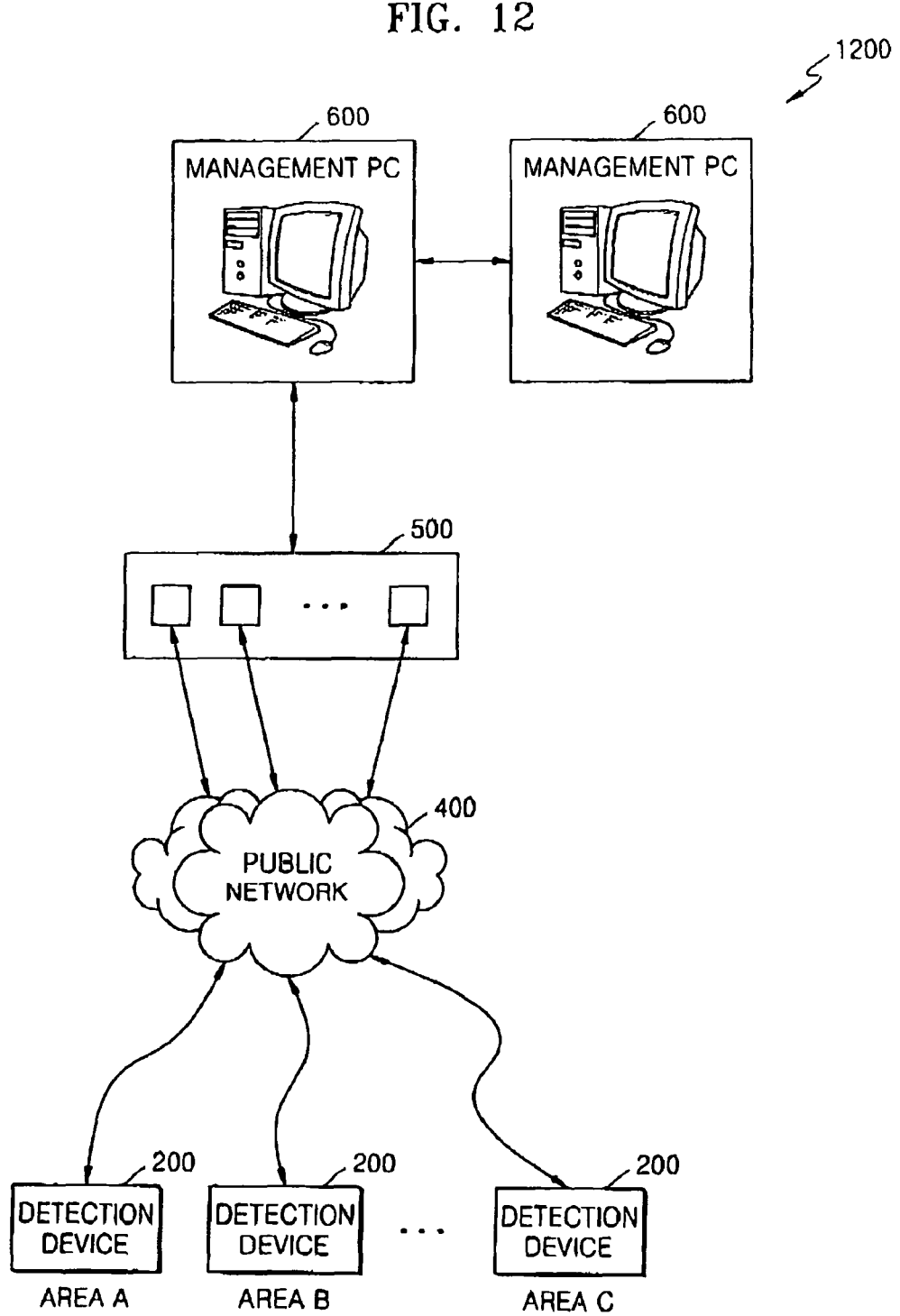

SYSTEM AND METHOD OF DETECTING COMMUNICATION DEVICE HAVING BUILT-IN CAMERA

This application claims the priority of Korean Patent Application No. 2003-42797, filed on Jun. 27, 2003, in the Korean Intellectual Property Office, the disclosure of which is incorporated herein in its entirety by reference.

BACKGROUND

1. Technical Field

The present invention relates to monitoring of a mobile communication device and in particular relates to a communication device having a built-in camera, and a system and method of detecting a communication device having a built-in camera.

2. Discussion of the Related Art

Communication devices such as PCS (Personal Communication Service) devices or PDA (Personal Digital Assistant) devices having built-in cameras allow a user to talk with a counterpart while viewing the counterpart. Since the built-in camera is either a digital still camera (DSC) or a camcorder, pictures taken with the built-in camera can be stored in a memory provided in the communication device, thereby letting the user to see them at any time.

Recently, there have been increased concerns regarding privacy violations and security leaks in situations where communication devices having built-in cameras have been used. Therefore, it is becoming increasingly necessary to regulate activities and access of users possessing communication devices having built-in cameras, whether such devices are switched on or off, within security zones. Illustrative examples of such security zones are places subject to a high risk of privacy violations or places with security restrictions. At times, it will be necessary to forcibly suspend camera functions of the communication devices having built-in cameras in such security zones.

SUMMARY OF THE INVENTION

Accordingly, at least one embodiment of the present invention provides a communication device having a built-in camera, of which a camera function is suspended when a user possessing the communication device enters a security zone and the camera function is restored when the user exits the security zone. A system and method of detecting a communication device having a built-in camera is disclosed, where the camera function of a communication device with a built-in camera is suspended when a user possessing such a device enters a security zone and the camera function is restored when the user exits the security zone.

According to an aspect of the present invention, a communication device including a camera, a camera function processing module, a mobile communication function processing module, a register, and a local area communication function processing module is provided. The camera function processing module controls the camera. The mobile communication function processing module performs at least one mobile communication function with an another communication device. The register, which is a memory unit, stores the state of the camera data, which indicates that the communication device has a built-in camera. The local area communication interface unit transmits the camera existence data wirelessly via electromagnetic waves such as radio waves (hereafter "by wireless") through the local area communication network in response to an external detection request signal received by wireless.

According to another aspect of the present invention, a communication device having above mentioned camera components and a power control unit is provided. The power control unit intercepts power supply to the camera function processing module in response to a power interception signal. The local area communication interface unit transmits particular identification data or camera existence data of the communication device by wireless through the local area communication network in response to an external authentication request signal received by wireless and generates the power interception signal in response to an external camera power-interception request signal received by wireless.

According to another aspect of the present invention, a communication device having above mentioned components and a key input unit and an enable bit setting unit is provided. The camera function processing module activates or deactivates a camera function selectively in accordance with a logic state of an enable bit signal in response to a key input signal indicating switching to a camera mode.

The mobile communication function processing module performs a mobile communication function with an another communication device in response to a key input signal indicating a transition to a communication mode. The key input unit generates the key input signal indicating the conversion to the camera mode or the communication mode. The local area communication interface unit transmits particular identification data or camera existence data of the communication device by wireless through the local area communication in response to an external authentication request signal received by wireless and generates a disable setting signal in response to an external disable-setting request signal received by wireless. The enable bit setting unit generates the enable bit signal having a logic state corresponding to the disable setting signal.

According to another aspect of the present invention, a system of detecting a communication device having a built-in camera is provided. The communication device transmits camera existence data by wireless through local area communication network in response to an external detection request signal received by wireless. The detection device transmits the external detection request signal by wireless to the communication device. The system may further include a display device that receives and displays the camera existence-display data, and the detection device may generate the camera existence-display data corresponding to the camera existence data received by wireless.

According to another aspect of the present invention, a system of detecting a communication device having a built-in camera, the system including a detection device and a display device is provided. The detection device transmits an authentication request signal to a communication device by wireless through local area communication, receives particular identification data or camera existence data of the communication device by wireless, and generates and transmits a camera power-interception request signal by wireless to the communication device when it is determined that the communication device has a built-in camera. The display device displays the camera existence data when it is determined that the communication device has the built-in camera.

According to another aspect of the present invention, a system of detecting a communication device having a built-in camera is provided. The detection device transmits an authentication request signal to a communication device by wireless through a local area communication network, and receives particular identification data or camera existence data of the communication device by wireless. The detection device generates and transmits a camera function-disable setting request signal to the communication device by wireless when it is determined that the communication device has a built-in camera. The display device displays the camera existence data, when it is determined that the communication device has the built-in camera.

According to another aspect of the present invention, a system of detecting a communication device is provided. The system having a built-in camera, a public network, detection devices, and a computer. The detection devices, which are provided in several areas, transmit an authentication request signal to a communication device by wireless through a local area communication network. The detection devices receive particular identification data or camera existence data of the communication device by wireless in response to the authentication request signal and then suspends a camera function of the communication device when it is determined that the communication device has a built-in camera, and outputs camera existence-display data corresponding to a camera power-interception request signal. The computer stores and manages the camera existence-display data.

According to another aspect of the present invention, a method of detecting a communication device having a built-in camera is provided. The method includes transmitting a detection request signal by wireless from a detection device, which performs local area communication with a communication device; and transmitting camera existence data by wireless from the communication device in response to the detection request signal. The method may further include outputting camera existence-display data corresponding to the camera existence data from the detection device; and allowing a predetermined display device to receive and display the camera existence-display data.

According to another aspect of the present invention, a method of detecting a communication device having a built-in camera is provided. The method includes transmitting an authentication request signal by wireless from a detection device, which performs local area communication with a communication device; transmitting particular identification data or camera existence data of the communication device by wireless in response to the authentication request signal; allowing the detection device to receive the particular identification data or the camera existence data and to generate and transmit a camera power-interception request signal by wireless when it is determined that the communication device has a built-in camera; and intercepting power supply to a camera function processing module of the communication device in response to the camera power-interception request signal received by wireless. The method may further include allowing a predetermined display device to receive and display camera existence-display data corresponding to the camera power-interception request signal.

According to another aspect of the present invention a method of detecting a communication device having a built-in camera is provided. The method includes transmitting an authentication request signal by wireless from a detection device, which is provided in a security zone and performs interactive local area communication with a communication device; transmitting particular identification data or camera existence data of the communication device by wireless from the communication device in response to the authentication request signal; transmitting a disable setting request signal by wireless from the detection device to the communication device when a user with the communication device comes in the security zone, in a case where the detection device receives the particular identification data or the camera existence data of the communication device and determines that the communication device has a built-in camera; and allowing the communication device to set an enable signal to a first logic state in response to the disable setting request signal received by wireless.

According to another aspect of the present invention, a method of detecting a communication device having a built-in camera is provided. The method includes transmitting an authentication request signal by wireless to a communication device from a detection device, which performs local area communication with the communication device through a local area network; transmitting particular identification data or camera existence data of the communication device by wireless from the communication device to the detection device in response to the authentication request signal; suspending a camera function of the communication device, when the detection device receives the particular identification data or the camera existence data of the communication device and determines that the communication device has a built-in camera; outputting camera existence-display data from the detection device, when the detection device determines that the communication device has a built-in camera; and storing and managing the camera existence-display data with a computer.

BRIEF DESCRIPTION OF THE DRAWINGS

Preferred embodiments of the invention are described with reference to the accompanying drawings, of which:

FIG. 12 is a block diagram illustrating an example of a system of managing communication device detection systems provided in several areas.

DETAILED DESCRIPTION OF THE INVENTION

The preferred embodiments of the present invention will be described with reference to the appended drawings.

Figure 1:
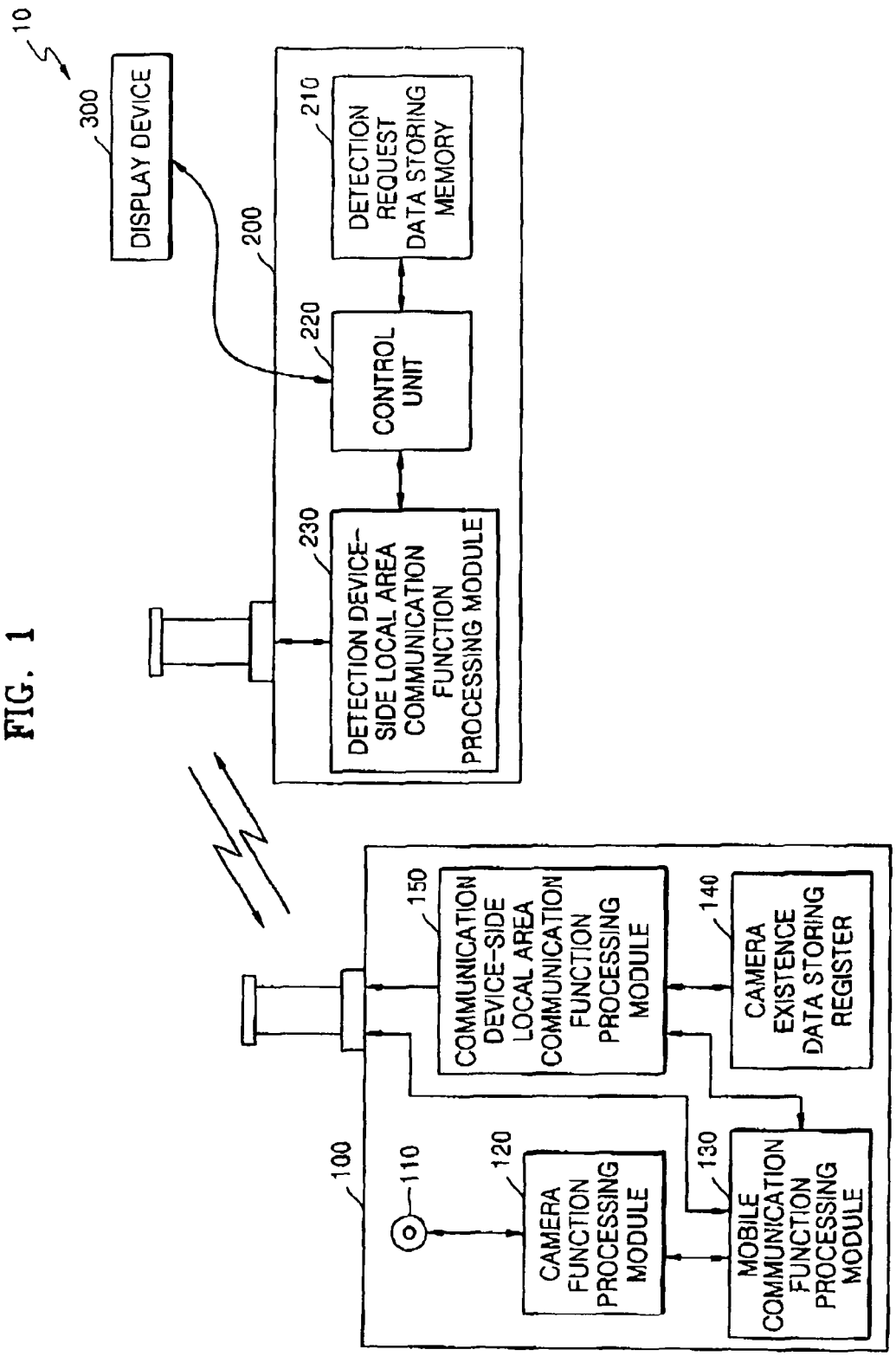
FIG. 1 is a block diagram illustrating a system of detecting a communication device having a built-in camera according to an embodiment of the present invention.

FIG. 1 is a block diagram illustrating a system 10 of detecting a communication device 100 having a built-in camera according to an embodiment of the present invention. The communication device detection system according to an embodiment of the present invention includes the communication device 100 having a built-in camera, a detection device 200, and a display device 300.

The communication device 100 performs at least one mobile communication function with other communication devices via a base station; device 100 performs a local area communication in a local area network, and transmits a camera existence-alarm signal by wireless through the local area communication network in response to a detection request signal received by wireless from the detection device 200.

The built-in camera (not shown) can be either a digital still camera or a camcorder. The communication device can be a conventional cellular phone with a built-in camera, a personal communication service (PCS) device, or a personal digital assistant (PDA) phone with a built-in camera, and the local area communication may use a BLUETOOTH™ system, a smart card system, or a wireless local area network (LAN) system. The local area communication is a wireless communication system for transmitting the camera existence-alarm signal to the detection device 200. In the local area communication network using the BLUETOOTH system, a counterpart node is identified and interactive communication is performed using a frequency hopping spread spectrum system.

The BLUETOOTH system was originally developed by Ericsson Co. Ltd., to perform wireless data communication for cellular phones, personal computers (PCs), digital still cameras, printers, PDAs, game machines, etc. The smart card system was developed to perform wireless data communication between a main system such as a reader, etc., and a card working with the power of a microwave form or a radio frequency (RF) form supplied from the main system. The smart card system can perform an identification of a person through wireless data communication using the smart card. As defined in the IEEE 802.11 standard, the wireless LAN system has been designed to allow a user to exchange data with other users by wirelessly connecting a device such as a computer, a communication device, etc., to a LAN of a private or a public network.

The communication device 100 includes the built-in camera 110, a camera function processing module 120, a mobile communication function processing module 130, a register 140, and a communication device-side local area communication function processing module 150. The built-in camera 110 outputs an analog image signal in response to a camera function control signal. The camera function processing module 120 generates the camera function control signal, converts the analog image signal into a digital image signal, and then processes the converted digital image signal to output a display signal for driving a display device (not shown).

The mobile communication function processing module 130 generates a mobile communication function control signal, performs a mobile communication function with another communication device via a base station, and performs a host function of inputting and outputting communication device-side local area communication data in response to a communication device-side local area communication function control signal. The mobile communication function processing module 130 includes a predetermined memory (not shown) that stores the display signal. The host function may include a BLUETOOTH host function, a smart card host function or a wireless LAN host function.

The register 140 stores camera existence data indicating that the communication device 100 includes the built-in camera 110. The communication device-side local area communication function processing module 150 generates the communication device-side local area communication function control signal, performs the local area communication in the local area network in accordance with the communication device-side local area communication data, and transmits the camera existence-alarm signal, obtained by processing the camera existence data, through the local area network in response to the detection request signal. Data, for example, the communication device-side local area communication data can be transmitted directly between the communication device-side local area communication function processing module 150 and the camera function processing module 120.

The detection device 200 outputs camera existence-display data corresponding to the camera existence-alarm signal, performs the local area communication with the communication device 100 in the local area network and transmits the detection request signal by wireless through the local area communication network.

The detection device 200 includes a memory 210, a control unit 220 and a detection device-side local area communication function processing module 230. The memory 210 stores the detection request data in accordance with a predetermined protocol. The predetermined protocol can include a communication protocol for the BLUETOOTH system, the smart card system, or the wireless LAN system. The control unit 220 inputs and outputs the detection device-side local area communication data in response to the detection device-side local area communication function control signal input from the detection device-side local area communication function processing module 230, outputs the camera existence-display data corresponding to the camera existence-alarm signal, reads out and outputs the detection request information and performs a general control of the detection device 200 operations.

The detection device-side local area communication function processing module 230 generates the detection device-side local area communication function control signal, performs the local area communication with the communication device 100 in accordance with the detection device-side local area communication data in the local area network, and transmits the detection request signal, obtained by processing the detection request data, by wireless through the local area communication network.

The display device 300 receives and displays the camera existence-display data. The display can include either a display using alarm light, sound or character message. When a user with the communication device 100 having the built-in camera 110 enters a detection area where the detection device 200 is provided, a security operator is notified of the intrusion through any suitable alerting device or technique, for example, a light emitting diode (LED), a speaker, a liquid crystal display (LCD) monitor, etc., provided in the display device 300.

Figure 2:
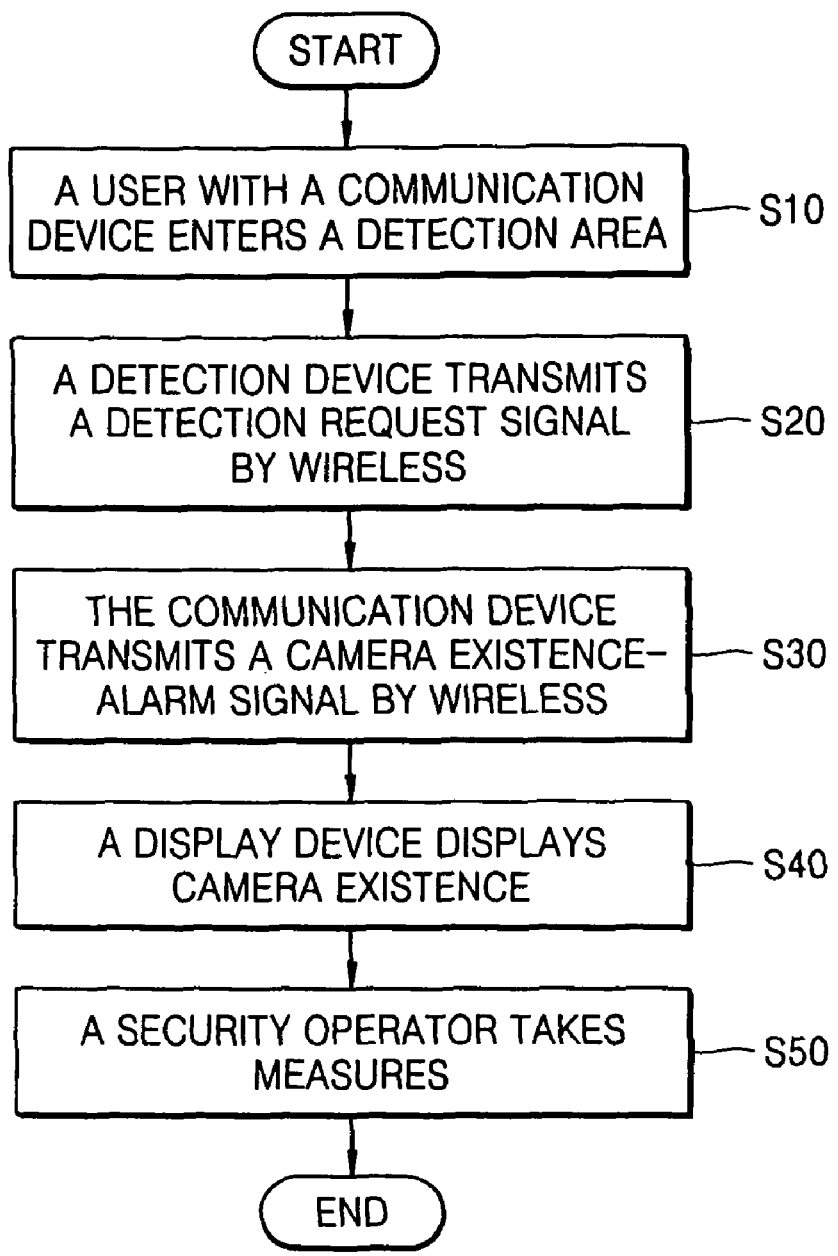
FIG. 2 is a flowchart illustrating operations of the communication device detection system of FIG. 1.
Figure 3:
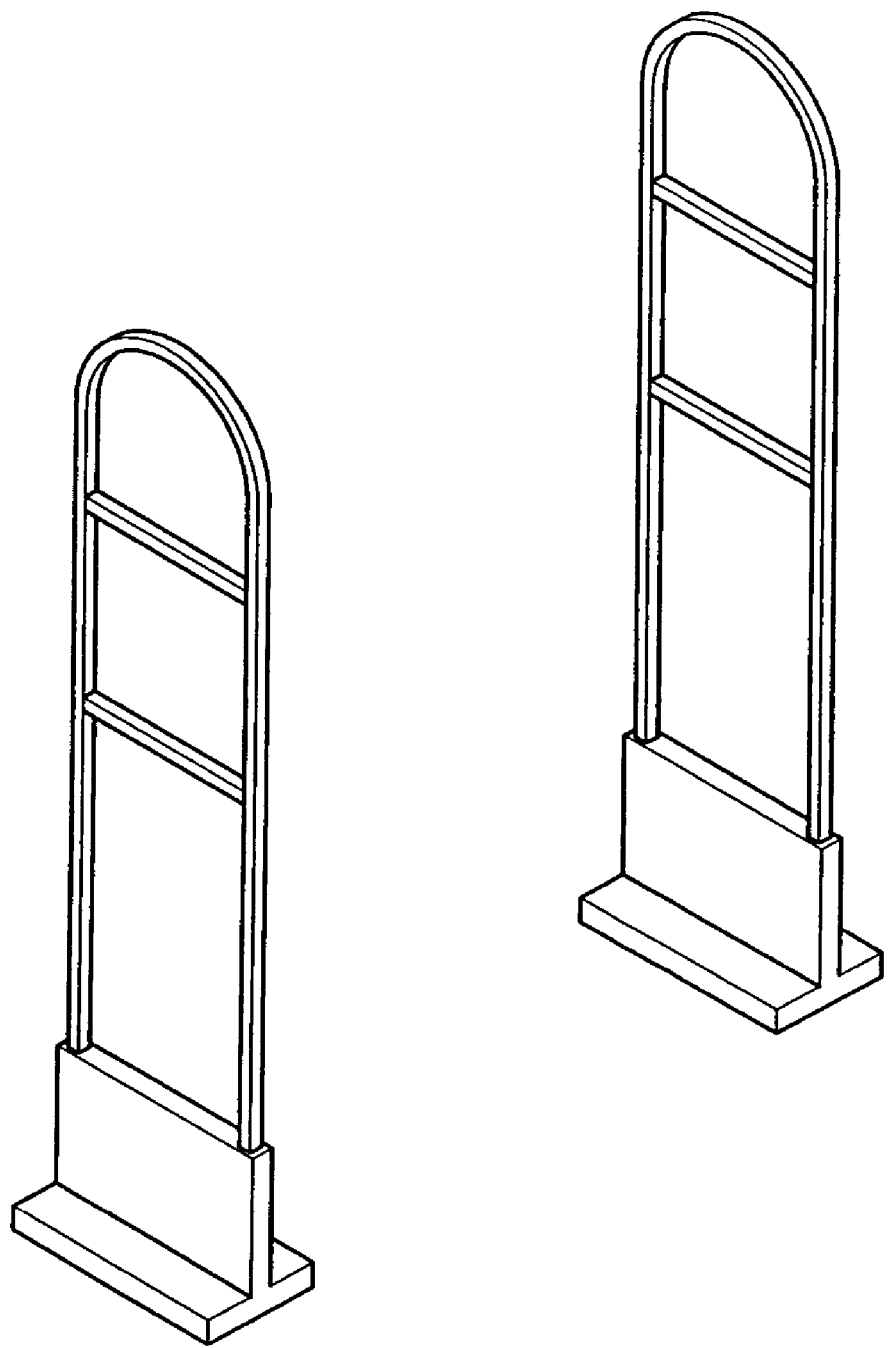
FIG. 3 is a diagram illustrating a security gate provided with a detection device.

Operation of the communication device detection system 10 of FIG. 1 will be described in detail next. FIG. 2 is a flowchart illustrating operation of the communication device detection system 10 of FIG. 1. First, the user with the communication device 100 having the built-in camera 110 enters the detection area, such as an exemplary security gate (see FIG. 3), where the detection device 200 is provided (S10). Usually, the detection device 200 may be provided in a place subjected to risks of privacy violation or security restrictions. However, those skilled in the art will appreciate that places subjected to risk of privacy violation or security restriction are only illustrative of the places where the detection device 200 may be deployed and such illustrations do not limit the invention in any manner. A user of the system using above system can choose as per his or her need the places where detection device 200 may be deployed.

At this time, the detection device 200, which executes the local area communication with the communication device 100 in a local area network, waits for a response from the communication device 100 after transmitting the detection request signal at any time by wireless through the local area communication (S20). The detection request signal is generated by processing the detection request data output from the memory 210 that stores the detection request data, in accordance with a predetermined protocol, for example, a communication protocol for the BLUETOOTH system, the smart card system or the wireless LAN system.

Accordingly, the communication device 100, which performs the mobile communication with other communication devices via a base station and executes the local area communication in the local area network, transmits the camera existence-alarm signal by wireless through the local area communication in response to the detection request signal (S30). The camera existence-alarm signal is generated by processing the camera existence data output from the register 140, which stores the camera existence data indicating that the communication device 100 includes the built-in camera 110. When receiving the camera existence-alarm signal, the detection device 200 outputs the camera existence-display data corresponding to the camera existence-alarm signal, and the display device 300 receives the camera existence-display data to display the data as any suitable alerting signal. For example, the alerting signal can be an alarm light, sound, or character message, etc., that is generated by using an LED, a speaker, an LCD monitor, etc. (S40).

Thereafter, a security operator, who is alerted by the detection device 200 via the alarm light as described above, the voice, the character message, etc., can appropriately deal with the user (S50). That is, the security operator can take any suitable remedial action. For example, the security operator can prohibit the user from entering the security zone where the detection device 200 is provided or can prohibit the user from carrying the communication device 100 having the built-in camera 110 in the security zone.

Figure 4:
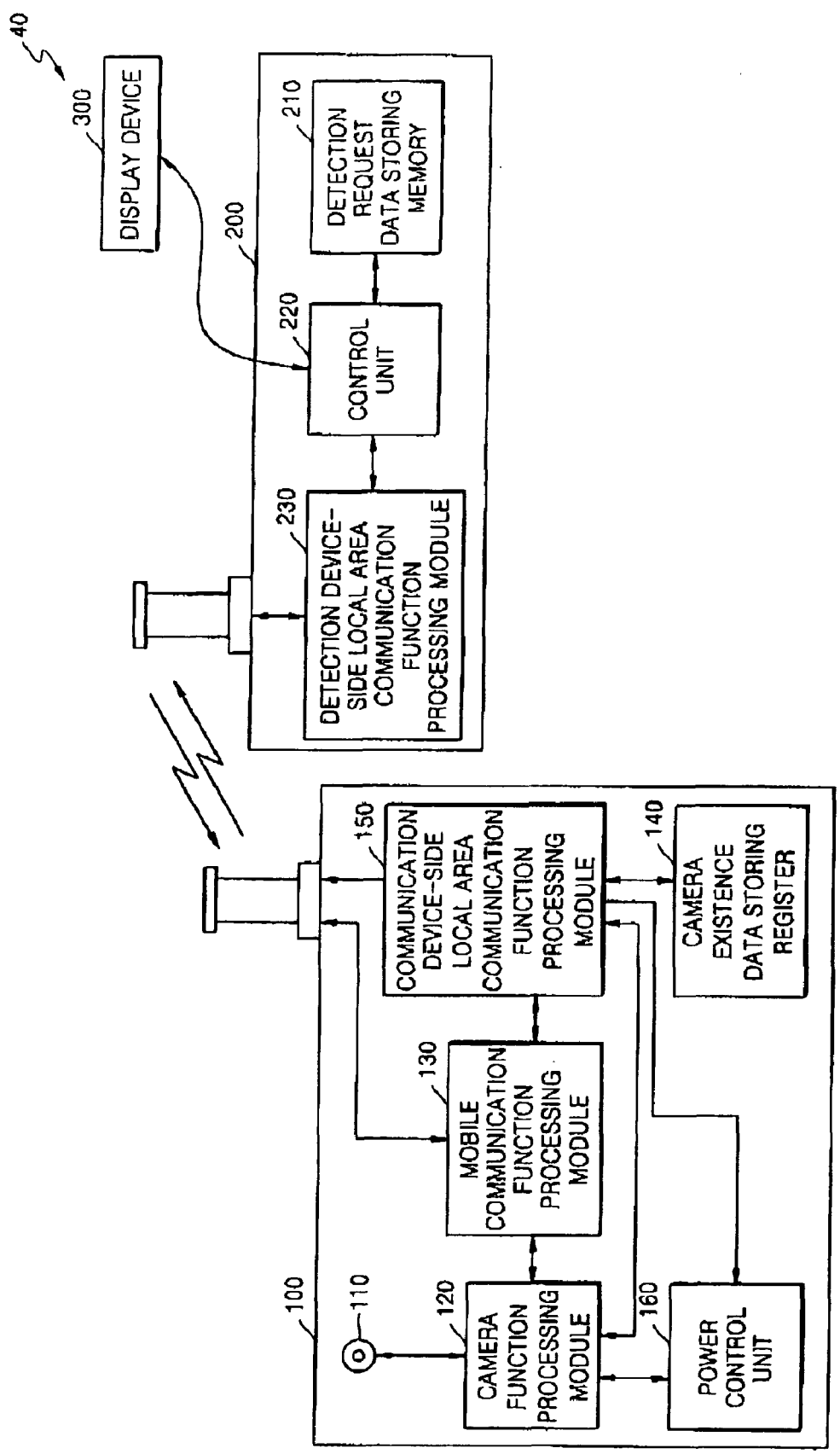
FIG. 4 is a block diagram illustrating a system of detecting a communication device having a built-in camera according to an embodiment of the present invention.

FIG. 4 is a block diagram illustrating a system 40 of detecting a communication device 100 having a built-in camera 110 according to another embodiment of the present invention. In FIG. 4, the communication device 100 included in the communication device detection system 40 further includes a power control unit 160, in addition to the elements included in the communication device 100 shown in FIG. 1. The operation of the communication device detection system 40 of FIG. 4 is broadly similar to that of the system 10 of FIG. 1, except for the operations associated with the power control unit 160.

In FIG. 4, when the communication device-side local area communication function processing module 150 generates a power interception signal in response to a camera power-interception request signal received by wireless, the power control unit 160 intercepts power supply to the camera function processing module 120 in response to the power interception signal. The camera power-interception request signal is generated by the control unit 220 of the detection device 200 when the camera existence-alarm signal is received, and is transmitted by wireless through the detection device-side local area communication function processing module 230.

Figure 5:
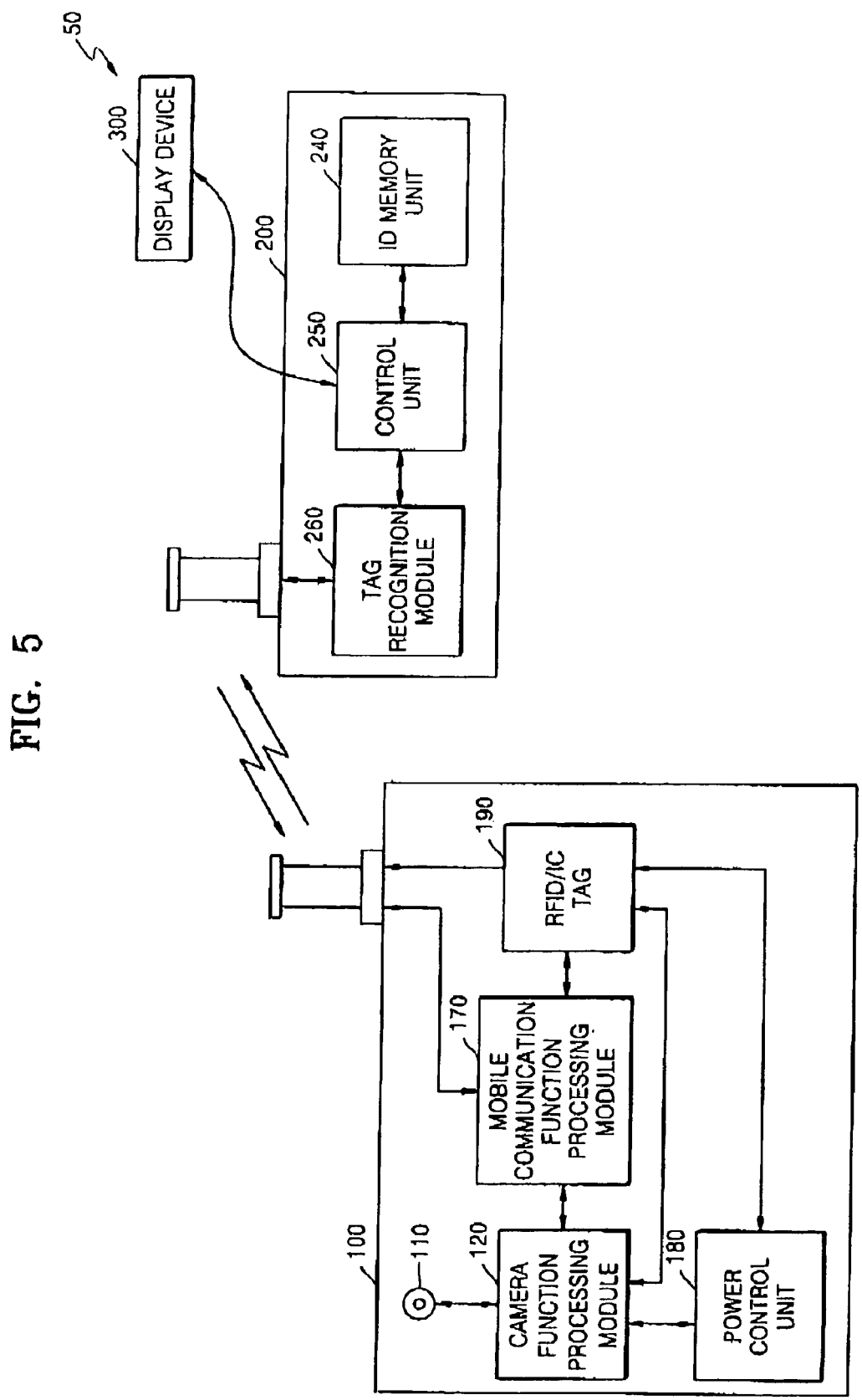
FIG. 5 is a block diagram illustrating a system of detecting a communication device having a built-in camera according to an embodiment of the present invention.
Figure 6:
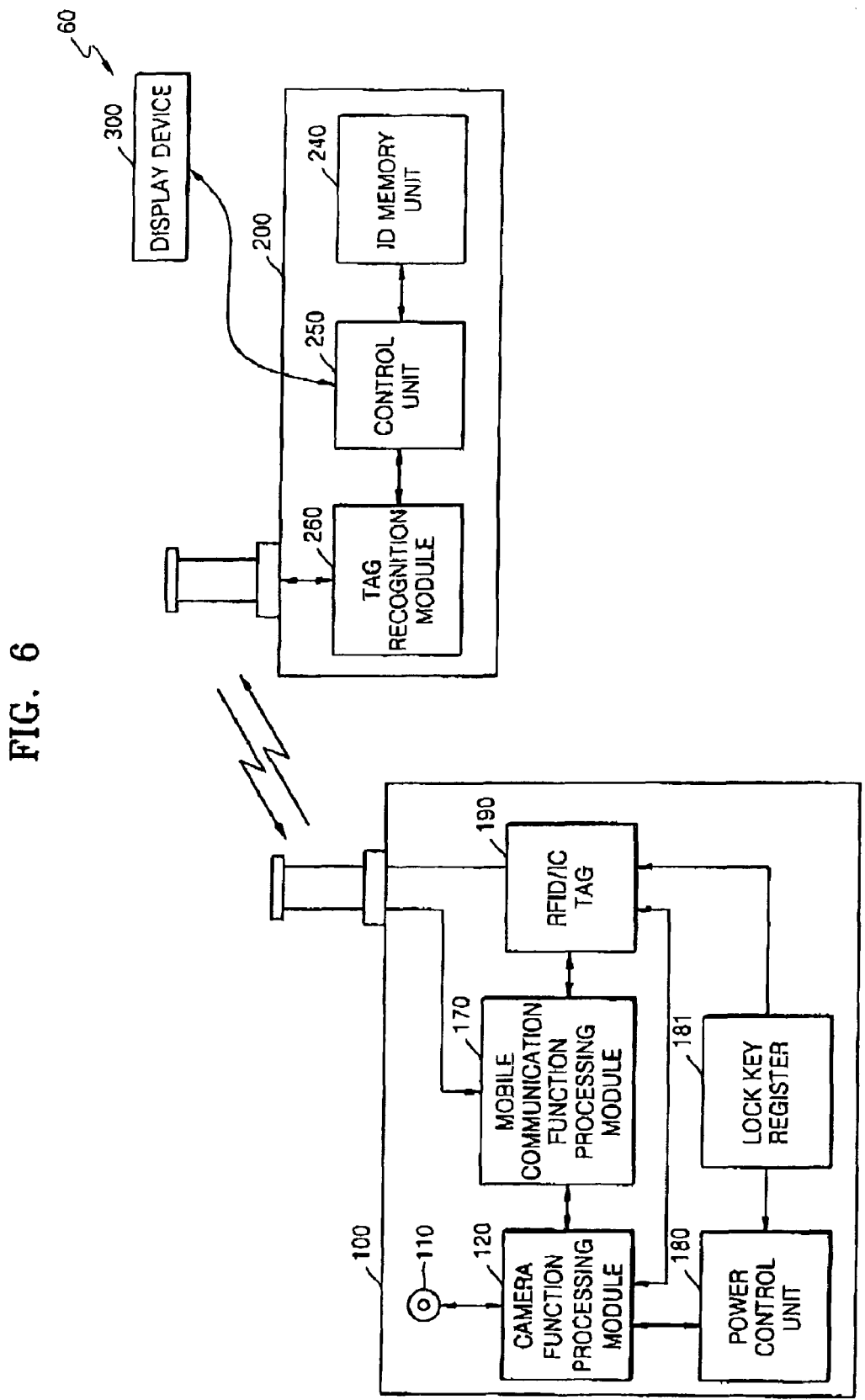
FIG. 6 is a block diagram illustrating a system of detecting a communication device having a built-in camera according to an embodiment of the present invention.

When the communication device 100 includes the built-in camera, the power supply to the camera function processing module 120 is forcibly intercepted regardless of on or off state of the communication device 100, thereby enhancing security, are shown in FIGS. 5 and 6.

FIG. 5 is a block diagram illustrating a system 50 of detecting a communication device 100 having a built-in camera according to an embodiment of the present invention. As shown in FIG. 5, the communication device detection system 50 according to an embodiment of the present invention includes a communication device 100, a detection device 200, and a display device 300. In FIG. 5, the communication device 100 performs mobile communication with other communication devices 100 via a base station, executes local area communication in a local area network, transmits particular identification data or camera existence data of the communication device 100 by wireless in response to an authentication request signal received by wireless and intercepts the power supply to a camera function processing circuit in response to a camera power-interception request signal received by wireless.

The detection device 200 executes the local area communication with the communication device in the local area network, transmits the authentication request signal by wireless to the communication device 100, receives the particular identification data or the camera existence data of the communication device 100 by wireless, and generates and transmits the camera power-interception request signal by wireless to the communication device 100 when it is determined that the communication device 100 includes the built-in camera 110. The display device 300 receives and displays a camera existence-display data corresponding to the camera power-interception request signal.

In FIG. 5, the communication device 100 includes a built-in camera 110, a camera function processing module 120, a mobile communication function processing module 170, a power control unit 180 and a radio frequency identification integrated circuit (RFID IC) tag 190. The built-in camera 110 captures an image and outputs an image signal in response to a camera function control signal, similarly to the camera 110 of FIG. 1. Similarly to the camera function processing module 120 of FIG. 1, the camera function processing module 120 generates the camera function control signal and processes the image signal and outputs a display signal. The mobile communication function processing module 170, similar to the mobile communication function processing module 150, generates the mobile communication function control signal, and executes the mobile communication with other communication device via a base station.

The power control unit 180 intercepts the power supply to the camera function processing module 120 in response to a power interception signal input from the RFID IC tag 190. The RFID IC tag 190 transmits the particular identification data or the camera existence data of the communication device 100 by wireless through the local area communication network in response to the authentication request signal and generates the power interception signal in response to the camera power-interception request signal received by wireless from the detection device 200.

The RFID IC tag 190 is a very small chip and does not have a power source similar to a smart card. However, the RFID IC tag 190 uses the authentication request signal or the camera power-interception request signal as a power source generated from a reader, that is, the detection device 200. The authentication request signal and the camera power-interception request signal generated from the detection device are radio signals having a microwave form or an RF wave form, and by using such radio signals, the interactive local area communication is performed between the detection device 200 and the RFID IC tag 190 provided in the communication device 100.

Further, the RFID IC tag 190 generates a power-interception release signal in response to a camera power-interception release signal received by wireless, when a user possesing the communication device 100 exits a security zone. At such time, the power control unit 180 releases the interception of the power supply to the camera function processing module 120 in response to the power-interception release signal. The camera power-interception release signal is generated from the detection device 200, as described later.

In FIG. 5, the detection device 200 includes an identification memory unit 240, a control unit 250 and a tag recognition module 260. The identification memory unit 240 stores identifications of the communication devices 100 having a built-in camera 110. For example, the identification memory unit 240 stores the identifications of the communication devices that are not allowed to enter the security zone. When the data transmitted from the RFID IC tag of the communication device 100 are not the particular identification data of the communication device 100, but the camera existence data, the identification memory unit 240 is not necessary.

When it is determined that the particular identification data of the communication device 100 are one of the identifications stored in the identification memory unit 240 or when it is determined that the camera existence data transmitted from the RFID IC tag 190 indicates that the communication device 100 has a built-in camera, the control unit 250 generates the camera power-interception request signal. The tag recognition module 260 transmits the authentication request signal and the camera power-interception request signal by wireless through the local area communication.

Further, when the control unit 250 recognizes that the user with the communication device 100 exits the security zone, the control unit 250 can control to transmit the camera power-interception release signal to the communication device 100 through the tag recognition module 260 by wireless. It can be recognized using the security gate (see FIG. 3) provided in an outlet of the security zone that the user with the communication device 100 goes out of the security zone. The detection device 200 can be provided in the security gate as shown in the exemplary illustration in FIG. 3.

FIG. 6 is a block diagram illustrating a system 60 of detecting a communication device 100 having a built-in camera according to another embodiment of the present invention. The system 60 shown in FIG. 6 is similar to the system 50 shown in FIG. 5, except that the communication device 100 includes a lock key register 181. The lock key register 181 stores the power interception signal generated from the RFID IC tag 190. The power interception signal is output to the power control unit 180, when power is supplied to the communication device 100 after the power interception signal is stored in the lock key register 181. The power-interception release signal described with reference to FIG. 5 may be stored in the lock key register 181. That is, when the user with the communication device 100 exits the security zone, the RFID IC tag 190 generates the power-interception release signal in response to the camera power-interception release signal received by wireless, and the lock key register 181 stores the power-interception release signal. The power control unit 180 releases the interception of power supply to the camera function processing module 120 in response to the power-interception release signal.

Figure 7:
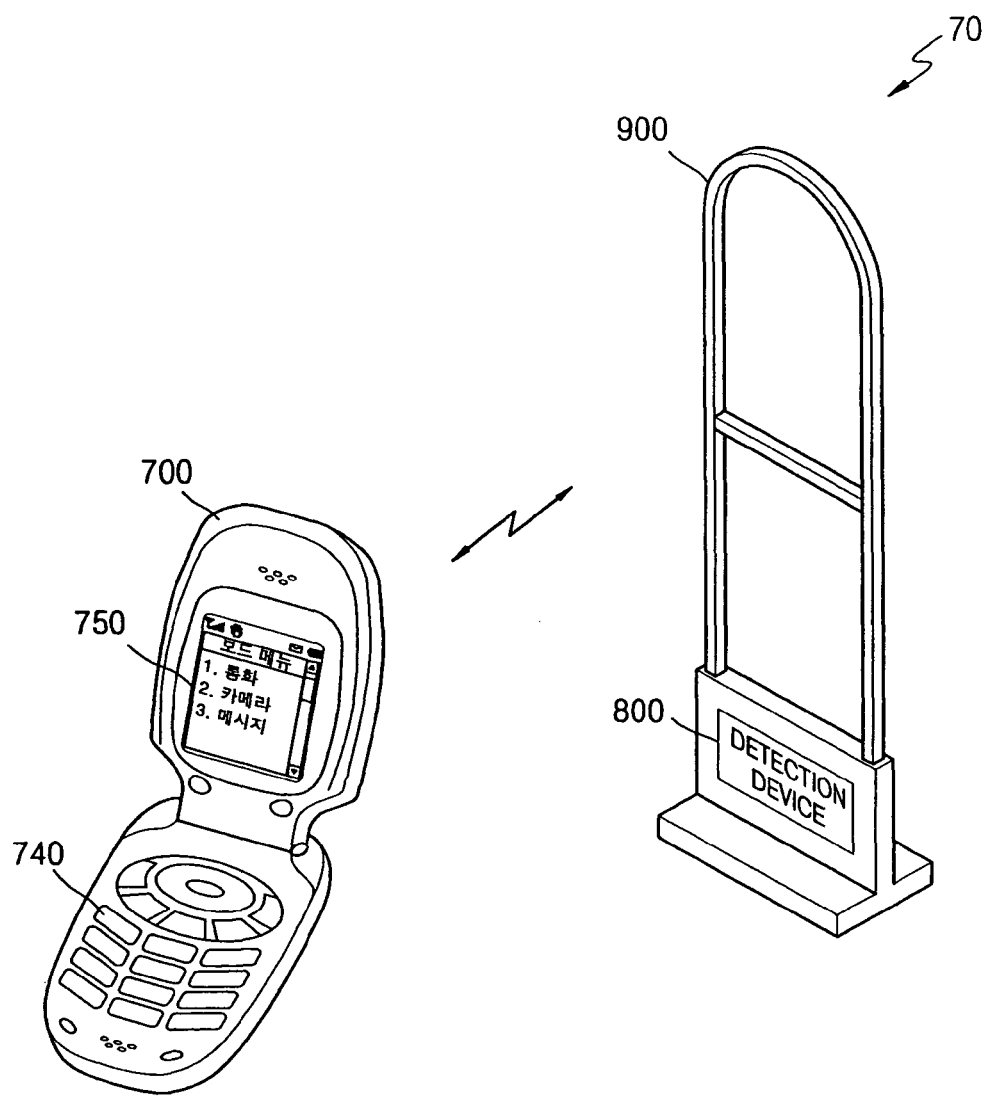
FIG. 7 is a block diagram illustrating a system of detecting a communication device having a built-in camera according to an embodiment of the present invention.

FIG. 7 is a block diagram illustrating a system 70 of detecting a communication device 700 having a built-in camera according to another embodiment of the present invention. As shown in FIG. 7, the system 700 according to the present invention includes a communication device 700 and a detection device 800.

The communication device 700 performs a mobile communication function with other communication devices via a base station and a camera function, similar to the communication devices 100 shown in FIGS. 1, 4, 5 and 6. Further, the communication device 700 transmits particular identification data (for example, a particular number, code, etc.) of the communication device 700 or camera existence data by wireless through interactive local area communication network.

Specifically, the communication device 700 according to an embodiment of the present invention sets a logic state of an enable bit signal in response to an enable or disable setting request signal received by wireless from the detection device 800. The particular identification data or the camera existence data can be transmitted in response to the authentication request signal transmitted by wireless from the detection device 800. When a logic state of the enable bit signal is set, the communication device 700 activates or deactivates the camera function selectively in response to a key input signal indicating conversion to a camera mode, depending upon the logic state. As described above, the RFID IC tag is used for the interactive local area communication. In addition, the smart card system, the wireless LAN system, or the BLUETOOTH system may be used for the local area communication.

The detection device 800 is provided in a security zone, such that it is built in a detection gate or detection bar 900. Further, when the detection device 800 receives the particular identification data or the camera existence data of the communication device 700 through the interactive local area communication and determines that the communication device 700 has a built-in camera, the detection device 800 transmits the disable setting request signal by wireless.

In a case where it is determined that the communication device 700 has a built-in camera, the detection device 800 transmits the enable setting request signal by wireless when the user with the communication device 700 goes out of the security zone. When the user with the communication device 700 comes in the security zone, the detection device 800 transmits the authentication request signal by wireless to the communication device 700, and in response to the authentication request signal, the communication device 700 transmits the particular identification data or the camera existence data by wireless.

Figure 8:
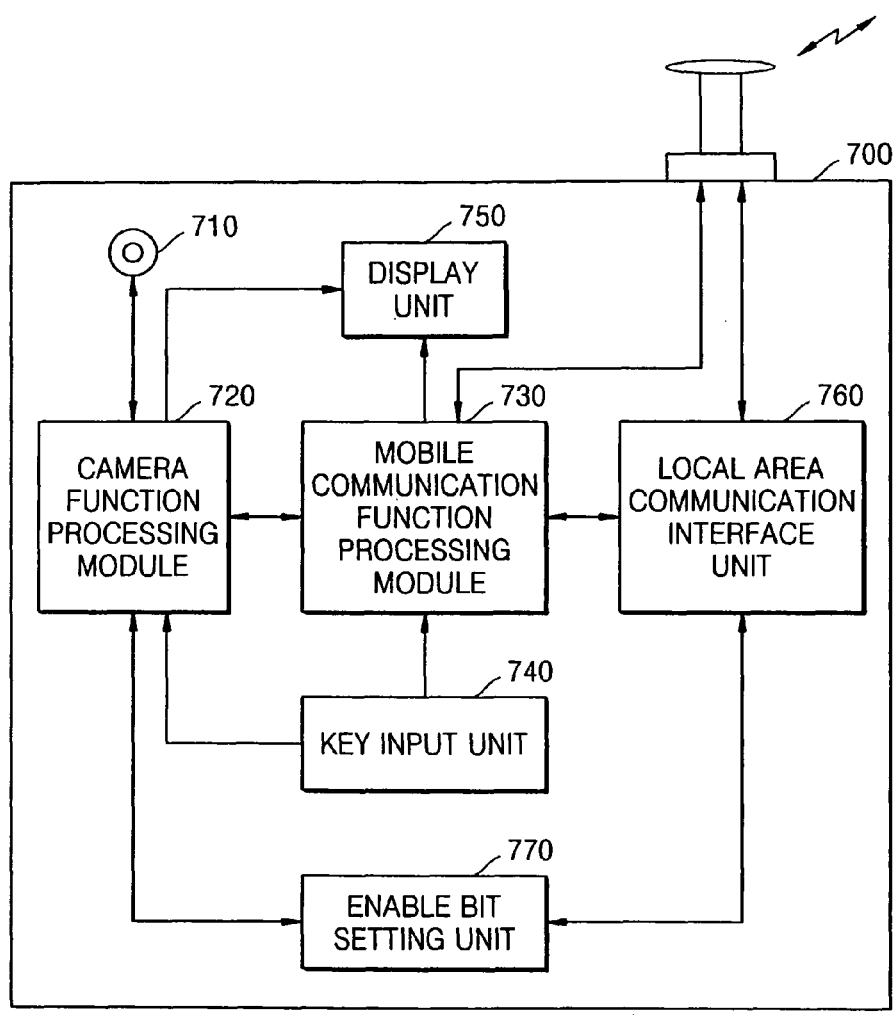
FIG. 8 is a block diagram specifically illustrating the communication device of FIG. 7.

FIG. 8 is a block diagram specifically illustrating the communication device 700 shown in FIG. 7. As shown in FIG. 8, the communication device 700 of FIG. 7 includes a camera 710, a camera function processing module 720, a mobile communication function processing module 730, a key input unit 740, a display unit 750, a local area communication interface unit 760, and an enable bit setting unit 770.

The camera 710 captures an image in response to a camera function activation signal and outputs an image signal. Here, the camera 710 may be a digital still camera or a camcorder or any other video capture device. The camera function processing module 720 generates the camera function activation/deactivation signal selectively in accordance with a logic state of the enable bit signal input from the enable bit setting unit 770 in response to the key input signal indicating conversion to a camera mode, processes the image signal, and outputs a display signal. The display unit 750 processes and displays the display signal to be visible for the user.

For example, when the enable bit signal has a first logic state (a logic low state), the camera function processing module 720 does not generate the camera function activation signal, even when the key input signal indicating conversion to the camera mode is received. When the camera function activation signal is not generated, the camera 710 cannot take a picture. When the camera function activation signal is not generated, the camera 710 may output an image signal that allows a specific pattern such as black, white, or watermark to be displayed in the display unit 750. In order to protect copyright for the taken picture, the camera 710 should be able to generate a digital watermark obtained by processing the particular identification data of the communication device 700.

As it is known that, the digital watermark is digital data for protecting copyright for digital intellectual property, and is added to digital image signals generated from the camera 710. The digital watermark is invisible and can be read out through a special program. In a case where a user comes in the security zone without permission, or in a case where a user with a communication device having allowable particular identification data comes in the security zone, as shown in FIG. 5, the digital watermark may be added to the digital image signals generated from the camera 710, in place of setting the enable bit signal to the first logic state. In a case where the digital watermark is added, it is possible to protect the intellectual property of the images taken outside the security zone and also to prevent the privacy violation and the security leak, by reading out the particular identification data.

On the contrary, in a case where the enable bit signal has a second logic state (a logic high state), the camera function processing module 720 generates the camera function activation signal, when the key input signal indicating conversion to the camera mode. The key input signal indicating conversion to the camera mode may be generated by allowing the user to select one choice in a mode menu displayed in the display unit 750 through a user interface (UI) program. Alternatively, the key input signal indicating conversion to the camera mode may be generated by allowing the user to select a predetermined hotkey provided in the communication device 700.

The mobile communication function processing module 730 performs the mobile communication function with other communication devices via a base station in response to the key input signal indicating conversion to a communication mode, similarly to the mobile communication function processing module 130 shown in FIGS. 1 and 4, or the mobile communication function processing module 170 shown in FIGS. 5 and 6. The key input unit 740 generates the key input signal indicating conversion either to the camera mode or the communication mode. In addition, the user may select a mode of transmitting and receiving short messages, a game mode, an Internet mode, etc., from a menu of options displayed in the display unit 750 by using the key input unit 740, similarly to a conventional communication device.

The local area communication interface unit 760 transmits the particular identification data or the camera existence data by wireless through the interactive local area communication, and generates the enable or disable setting signal in response to the enable or disable setting request signal received by wireless from the detection device 800. The enable bit setting unit 770 stores and outputs the enable bit signal having the first logic state or the second logic state in response to the enable or disable setting signal. The enable bit signal may be stored in a register that stores a one-bit digital signal. As described above, the RFID IC tag system, the smart card system, the wireless LAN system, or the BLUETOOTH system may be used for the interactive local area communication.

Figure 9:
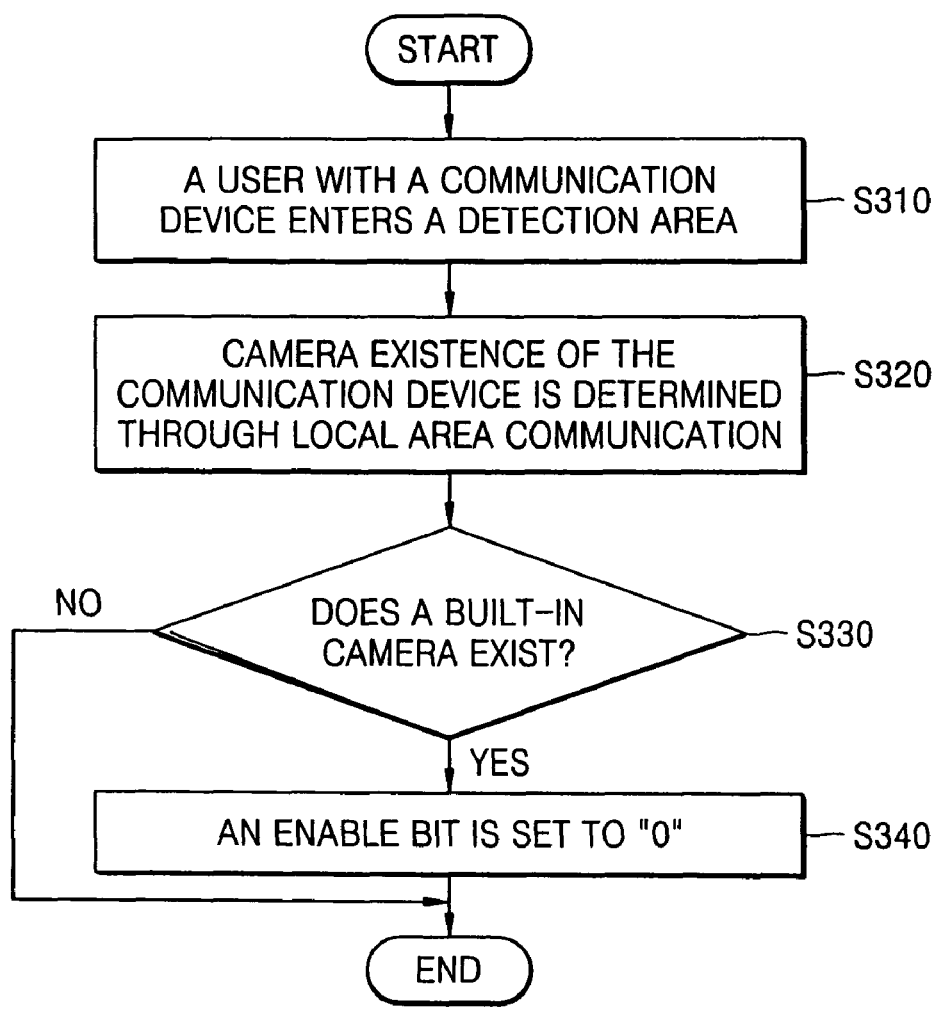
FIG. 9 is a flowchart illustrating operation of the system of FIG. 7 when a user with a communication device enters in a security zone.

Next, the system 70 of detecting a communication device 700 having a built-in camera will be described in more detail. FIG. 9 is a flowchart illustrating operation of the system 70 shown in FIG. 8, when the user with the communication device 700 comes in the security zone. First, the user with the communication device 700 having a built-in camera 710 enters a detection area provided with the detection gate or detection bar 900 having the detection device 800 (S310). The detection device 800 is provided in a security zone such as a place subjected to privacy violation or security leak. At that time, the detection device 800 executing the interactive local area communication with the communication device 700 in the local area network transmits the authentication request signal by wireless through the interactive local area communication network, and determines whether the communication device 700 has a built-in camera 710 on the basis of the particular identification data or the camera existence data received from the communication device 700 in response to the authentication request signal (S320). As described above, the authentication request signal is generated through the interactive local area communication in accordance with a predetermined protocol such as a communication protocol for the RFID IC tag system, the BLUETOOTH system, the smart card system, or the wireless LAN system.

Accordingly, when the detection device 800 determines that the communication device 700 has a built-in camera 710, it follows that the user with the communication device 700 is in the security zone. Therefore, the detection device 800 transmits the disable setting request signal by wireless to the communication device 700. At that time, the local area communication interface unit 760 generates the disable setting signal in response to the disable setting request signal received by wireless, and the enable bit setting unit 770 stores and outputs the enable bit signal having the first logic state in response to the disable setting signal (S330 to S340).

Figure 10:
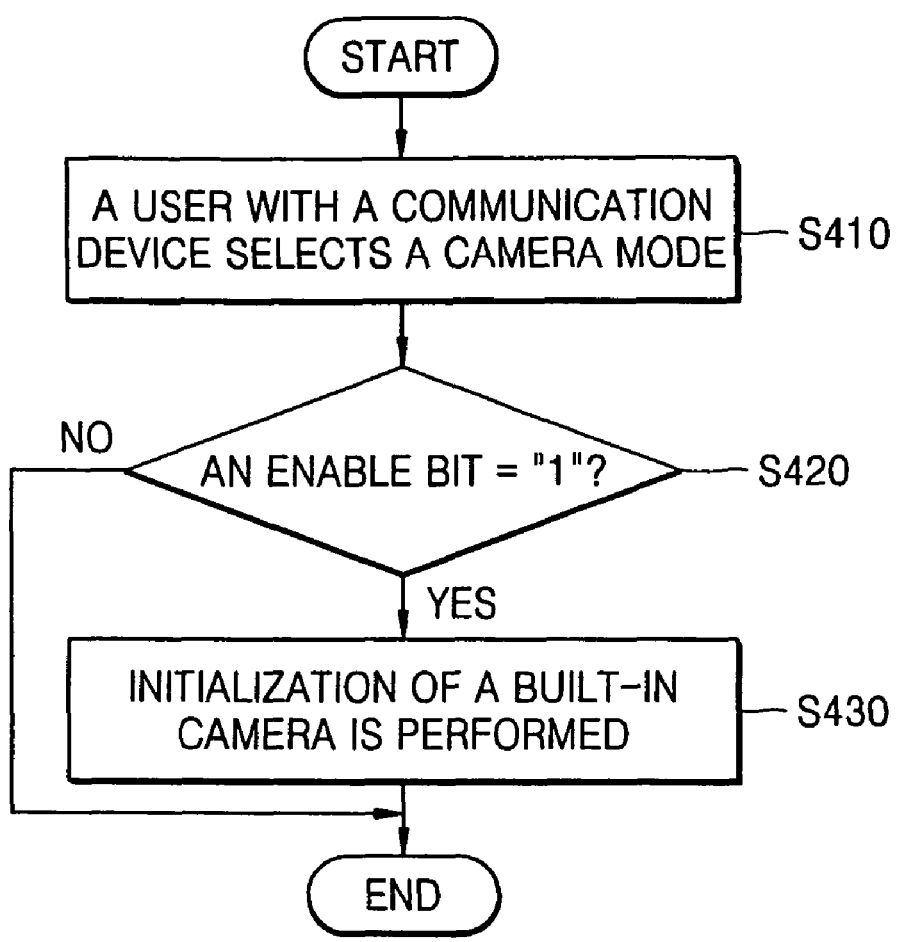
FIG. 10 is a flowchart illustrating operation of the system of FIG. 7 when the user with the communication device enables a camera function through a user interface (UI) menu.

FIG. 10 is a flowchart illustrating operation of the system 70 shown in FIG. 7 when the user activates the camera function through the user interface (UI) menu. Referring to FIG. 10, when the user selects the camera mode in the mode menu displayed in the display unit 750 by means of the user interface (UI) program, it is determined (S410) whether an initialization routine of the camera function processing module 720 should be activated in accordance with the logic state of the enable bit signal. That is, when the user with the communication device 700 enters the security zone and thus the enable bit signal is set to the first logic state as shown in FIG. 9, the camera function processing module 720 cannot activate the initialization routine, and does not generate the camera function activation signal even when the key input signal indicating conversion to the camera mode (S420).

At that time, as described above, the camera 710 can output the image signal for displaying a specific pattern such as black, white, or watermark through the display unit 750. Alternatively, in a case where a user comes in the security zone without permission, or in a case where a user with a communication device having allowable particular identification data enters the security zone, the digital watermark using the particular identification data may be added to the digital image signals generated from the camera 710, in place of setting the enable bit signal to the first logic state.

The key input signal indicating conversion to the camera mode is generated when the user selects one choice in the UI mode menu displayed in the display unit or when the user selects a predetermined hotkey provided in the communication device 700. Since the enable bit signal is not set to the first logic state when the user with the communication device 700 having a built-in camera 710 stays outside the security zone, the initialization routine of the camera function processing module 720 can be activated (S430).

Figure 11:
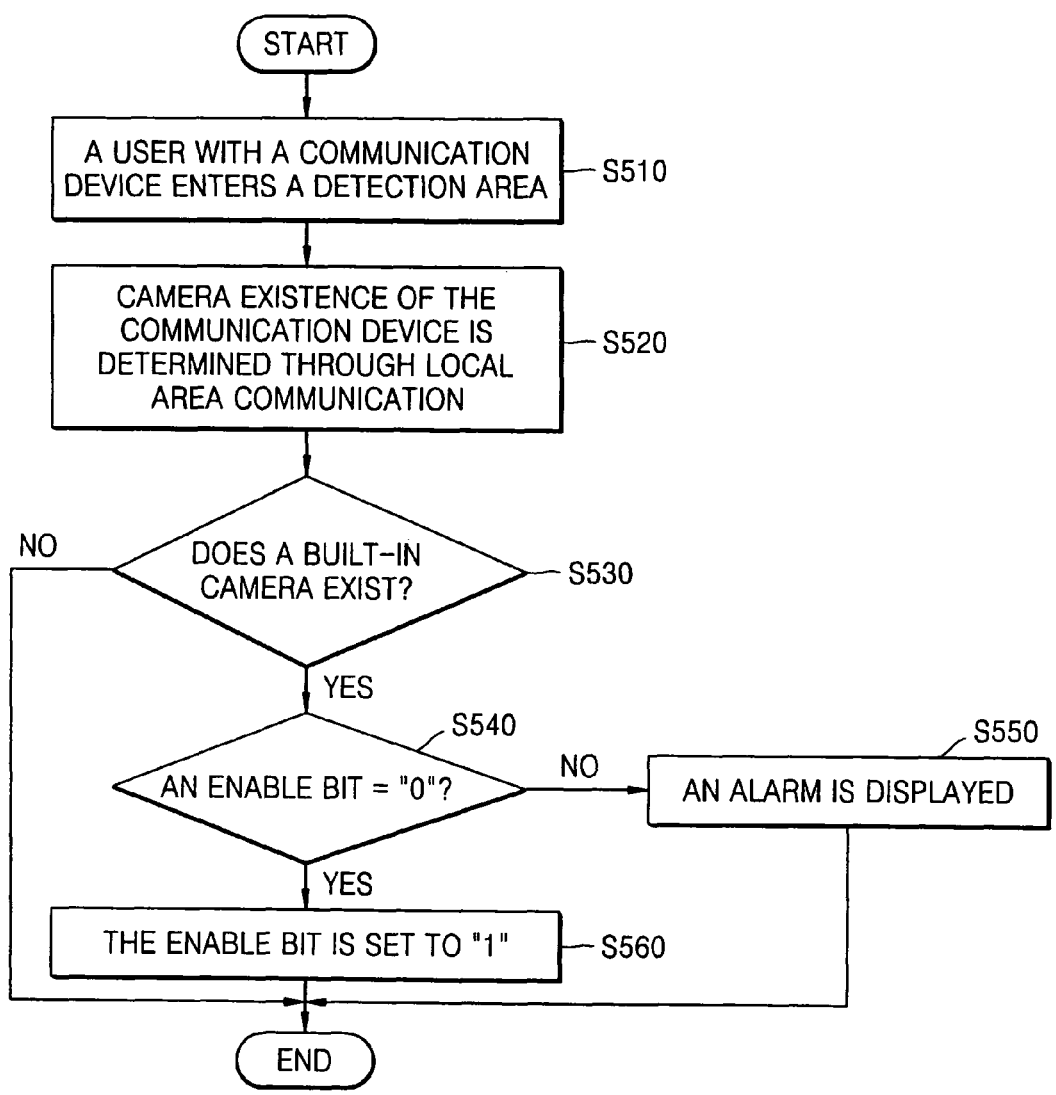
FIG. 11 is a flowchart illustrating operation of the system of FIG. 7 when the user with the communication device exits the security zone.

FIG. 11 is a flowchart illustrating operation of the system 70 shown in FIG. 7, when the user with the communication device 700 goes out of the security zone. First, the user with the communication device 700 having a built-in camera 710 enters the detection area provided with the detection gate or detection bar 900 in order to go out of the security zone (S510). When the user with the communication device 700 exits the security zone, the detection device 800 determines whether the communication device 700 has a built-in camera 710 in the same manner as shown in FIG. 9 (S520). When it is determined the communication device 700 has a built-in camera 710, the detection device 800 performs a process of setting the enable bit signal (S530).

In order to set the enable bit signal, the detection device 800 transmits the enable setting request signal by wireless, the local area communication interface unit 760 generates the enable setting signal in response to the enable setting request signal received by wireless, and the enable bit setting unit 770 stores and outputs the enable bit signal having the second logic state in response to the enable setting signal (S540 and S560). When the enable bit signal is set to the second logic state, it means that the camera function processing module 720 can activate the initialization routine. Therefore, the camera function processing module 720 generates the camera function activation signal, when the key input signal indicating conversion to the camera mode is received. On the other hand, in a case where the user with the communication device 700 having a built-in camera 710 comes in without permission and goes out of the security zone, the enable bit signal is set to the second logic state, and thus the user is estimated to have utilized the camera function. In this case, to prevent the security leak, the detection device 800 is allowed to output alarm sounds indicating entrance without permission. A security operator of the detection gate or detection bar 900 can take necessary measures, for example, confiscating the communication device 700 or erasing the memory storing the image data.

FIG. 12 is a block diagram illustrating a management system 1200 for the systems 10, 40 to 70 of detecting the communication devices 100, 700 provided in several areas. Referring to FIG. 12, the management system 1200 for the systems 10, 40 to 70 of detecting the communication devices 100, 700 includes a public network 400, detection devices 200 provided in several areas, a multi port 500 and computers 600.

Operation of the detection devices 200, 800 provided in several areas is the same as described in the first to fifth embodiments of the present invention shown in FIGS. 1 and 4 to 7. The detection devices 200, 800 provided in several areas can suspend the camera function of the communication device when the user with the communication device enters the security zone, and can recover the camera function of the communication device when the users with the communication device goes out of the security zone. In order to suspend the camera function, the detection devices 200, 800 generate the camera power-interception request signal or the camera function-disable setting request signal. Further, in order to recover the camera function, the detection devices 200, 800 generate the camera power-interception release signal or the camera function-enable setting request signal. Specifically, when it is determined that the communication devices 100, 700 have a built-in camera, the detection devices 200, 800 output the camera existence-display data corresponding to the camera power-interception request signal or the camera function-disable setting request signal.

The multi port 500 receives the camera existence-display data from the respective detection devices 200, 800 through the public network 400 and outputs the data through one path. That is, the multi port 500 corresponds to an interface device that outputs the multiple input signals through one line. The computers 600 store and manage the camera existence-display data received through the multi port 500 from the detection devices 200, and display a list thereof. Operators of the computers 600 can manage user identifications or communication device identifications of users that come in or go out of the security zone, and monitor the number of users or specific target identifications, thereby managing the security zone efficiently.

As described above, in the systems 10, 40 to 60 for detecting a communication device having a built-in camera according to the embodiments of the present invention, the detection device 200 transmits the detection request signal by wireless to the communication device 100, and the communication device 100 transmits the camera existence-alarm signal by wireless to the detection device 200 in response to the detection request signal. Therefore, an operator can easily recognize whether the user entering the detection area provided with the detection device 200 carries the communication device 100 having a built-in camera 110 through the display device 300.

Further, the detection device 200 can transmit the authentication request signal by wireless to the communication device 100, receive the particular identification data or the camera existence data of the communication device 100 in response to the authentication request signal, and when it is determined that the communication device 100 has a built-in camera 110, generate the camera power-interception request signal. Furthermore, the detection device 200 can generate the camera power-interception release signal, when the user with the communication device 100 goes out of the security zone.

Further, in the system 70 of detecting the communication device 700 having a built-in camera according to one of the embodiments of the present invention, when the detection device 800 determines that the communication device 700 has a built-in camera 710, the detection device 800 transmits the disable setting request signal by wireless to the communication device 700 when the user with the communication device 700 comes in the security zone, and transmits the enable setting request signal by wireless when the user with the communication device 700 goes out of the security zone. Accordingly, the communication device 700 can activate or deactivate the camera function of the built-in camera 710 selectively in response to the key input signal indicating conversion to the camera mode in accordance with the logic state of the enable bit signal, by setting the logic state of the enable bit signal in response to the enable or disable setting request signal received by wireless.

As described above, the communication device having a built-in camera according to at least one embodiment of the present invention can transmit the camera existence-alarm signal or the particular identification data through the RFID/IC tag. Accordingly, the system of detecting a communication device having a built-in camera can suspend the camera function of the communication device when a user with the communication device having a built-in camera comes in a security zone, and can restore the camera function of the communication device when the user goes out of the security zone.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A communication device comprising:
   a camera;
   a camera function processing module that controls the camera;

a mobile communication function processing module that performs a mobile communication function with an another communication device;

a register that stores camera existence data indicating that the communication device includes a built-in camera;

a local area communication interface unit that transmits the camera existence data by wireless in response to an external detection request signal received by wireless; and a power control unit that intercepts power supplied to the camera function processing module in response to a power interception signal from a radio frequency identification integrated circuit (RFID IC) tag, wherein the local area communication interface unit generates an enable setting signal in response to an external enable-setting request signal received by wireless, wherein the camera function processing module disables the camera function when the enable setting signal has a first logic state, and the camera function processing module activates the camera function when the enable setting signal has a second logic state, and wherein the camera outputs image signals for displaying a specific image pattern when the enable setting signal has the first logic state.

2. The communication device according to claim 1, wherein the local area communication interface unit generates the power interception signal in response to a camera power-interception request signal received by wireless from an external system.

3. The communication device according to claim 1, wherein the local area communication interface unit performs interactive local area communication by using a radio frequency identification integrated circuit (RFID IC) tag.

4. A system of detecting a communication device having a built-in camera, the system comprising:

a communication device that transmits camera existence data by wireless through a local area communication network using a radio frequency identification integrated circuit (RFID IC) tag in response to an external detection request signal received by wireless;

a detection device that transmits the external detection request signal by wireless to the communication device; and a control unit controls to transmit a camera power-interception request signal to the communication device in response to the camera existence data received by wireless, wherein the RFID IC tag provides a signal to a power control unit in the communication device that intercepts power supplied to a camera function processing module in the communication device in response to a power interception signal from the RFID IC tag, wherein the communication device generates an enable setting signal in response to an external enable-setting request signal received by wireless, wherein the camera function processing module disables a camera function when the enable setting signal has a first logic state, and the camera function processing module activates the camera function when the enable setting signal has a second logic state, and wherein the built-in camera outputs image signals for displaying a specific image pattern when the enable signal has the first logic state.

5. The system according to claim 4, further comprising:
a display device that receives and displays camera existence-display data, wherein the detection device generates the camera existence-display data corresponding to the camera existence data received by wireless.

6. The system according to claim 4, wherein the detection device comprises:

a memory that stores detection request data in accordance with a predetermined protocol; and a local area communication function processing module that processes the detection request data and transmits the external detection request signal by wireless to the communication device.

7. The system according to claim 6, wherein the control unit controls to transmit a camera power-interception request signal through the local area communication function processing module.

8. A system of detecting a communication device having a built-in camera, the system comprising:

a detection device that transmits an authentication request signal to a communication device by wireless through a local area communication network using a radio frequency identification integrated circuit (RFID IC) tag, receives particular identification data or camera existence data of the communication device by wireless, and generates and transmits a camera power-interception request signal by wireless to the communication device when it is determined that the communication device has a built-in camera;

a power control unit in the communication device that intercepts power supplied to the built-in camera in response to a power interception signal from the RFID IC tag; and a display device that displays the camera existence data when it is determined that the communication device has the built-in camera, wherein the communication device generates an enable setting signal in response to an external enable-setting request signal received by wireless, wherein a camera function processing module in the communication device disables a camera function when the enable setting signal has a first logic state, and the camera function processing module activates the camera function when the enable setting signal has a second logic state, and wherein the built-in camera outputs image signals for displaying a specific image pattern when the enable signal has the first logic state.

9. The system according to claim 8, wherein the detection device comprises:

an identification memory unit that stores identifications of communication devices having a built-in camera;

a control unit that generates the camera power-interception request signal, when it is determined that the particular identification data are at least one of the identifications stored in the identification memory unit and the camera existence data as received through wireless; and a tag recognition module that transmits the authentication request signal and the camera power-interception request signal by wireless to the communication device.

10. The system according to claim 9, wherein the control unit controls to transmit a camera power-interception release signal to the communication device by wireless through the tag recognition module, when a user with the communication device exits a security zone.

11. A system of detecting a communication device having a built-in camera, the system comprising:

a detection device that transmits an authentication request signal to a communication device by wireless through a local area communication network using a radio frequency identification integrated circuit (RFID IC) tag, receives particular identification data or camera existence data of the communication device by wireless, and generates and transmits a camera function-disable setting request signal to the communication device by wireless, when it is determined that the communication device has a built-in camera;

a power control unit in the communication device that intercepts power supplied to the built-in camera in response to a power interception signal from the RFID IC tag; and a display device that displays the camera existence data, when it is determined that the communication device has a built-in camera, wherein the communication device generates an enable setting signal in response to an external enable-setting request signal received by wireless, wherein a camera function processing module disables a camera function when the enable setting signal has a first logic state, and the camera function processing module activates the camera function when the enable setting signal has a second logic state, and wherein the built-in camera outputs image signals for displaying a specific image pattern when the enables setting signal has the first logic state.

12. The system according to claim 11, wherein the detection device generates and transmits a camera function-enable setting request signal to the communication device by wireless, when a user possessing the communication device exits a security zone.

13. A system of detecting a communication device having a built-in camera, the system comprising:

a public network;

detection devices, which are provided in several areas within the public network, that transmit an authentication request signal to a communication device by wireless through a local area communication network using a radio frequency identification integrated circuit (RFID IC) tag, receives particular identification data or camera existence data of the communication device by wireless in response to the authentication request signal, generates the camera power-interception request signal or a camera function-disable setting request signal and suspends a camera function of the communication device in response to a power interception signal from the RFID IC tag when it is determined that the communication device has a built-in camera, and outputs camera existence-display data corresponding to a camera power-interception request signal; and a computer that stores and manages the camera existence-display data, wherein the communication device generates an enable setting signal in response to an external enable-setting request signal received by wireless, wherein a camera function processing module in the communication device disables the camera function when the enable setting signal has a first logic state, and the camera function processing module activates the camera function when the enable setting signal has a second logic state, and wherein the camera outputs image signals for displaying a specific image pattern when the enable signal has the first logic state.

14. The system according to claim 13, wherein the detection devices generate at least one of a camera power-interception release signal and a camera function-enable setting request signal and recover the camera function of the communication device.

15. A method of detecting a communication device having a built-in camera, the method comprising:

transmitting a detection request signal by wireless from a detection device, which performs local area communication with a communication device using a radio frequency identification integrated circuit (RFID IC) tag;

transmitting camera existence data by wireless from the communication device in response to the detection request signal;

generating and transmitting a camera power-interception request signal by wireless from the detection device in response to the camera existence data; and intercepting power supplied to the built-in camera in response to a power interception signal from the RFID IC tag, wherein the communication device generates an enable setting signal in response to an external enable-setting request signal received by wireless, wherein a camera function processing module in the communication device disables a camera function when the enable setting signal has a first logic state, and the camera function processing module activates the camera function when the enable setting signal has a second logic state, and wherein the camera outputs image signals for displaying a specific image pattern when the enable setting signal has a first logic state.

16. The method according to claim 15, further comprising:

outputting camera existence-display data corresponding to the camera existence data from the detection device; and allowing a predetermined display device to receive and display the camera existence-display data.

17. The method according to claim 16, wherein the camera existence data are generated by processing the camera existence data stored in a predetermined memory unit.

18. The method according to claim 16, wherein the detection request signal is generated by processing detection request data stored in a predetermined memory.

19. A communication device comprising:

a camera;

a camera function processing module that controls the camera;

a mobile communication function processing module that performs a mobile communication function with an another communication device;

a register that stores camera existence data indicating that the communication device includes a built-in camera;

a local area communication interface unit that transmits the camera existence data by wireless in response to an external detection request signal received by wireless, the local area communication interface unit performing interactive local area communication by using a radio frequency identification integrated circuit (RFID IC) tag; and a power control unit that intercepts power supplied to the camera function processing module in response to a power interception signal from the RFID IC tag, wherein the local area communication interface unit generates the power interception signal in response to a camera power interception request signal received by wireless from an external system, wherein the power control unit releases interception of the power supply to the camera function processing module in response to a power-interception release signal, wherein the local area communication interface unit generates an enable setting signal in response to an external enable-setting request signal received by wireless, wherein the camera function processing module disables the camera function when the enable setting signal has a first logic state, and the camera function processing module activates the camera function when the enable setting signal has a second logic state, and wherein the camera outputs image signals for displaying a specific image pattern when the enable setting signal has a first logic state.

* * * * *